Patented June 5, 1923.

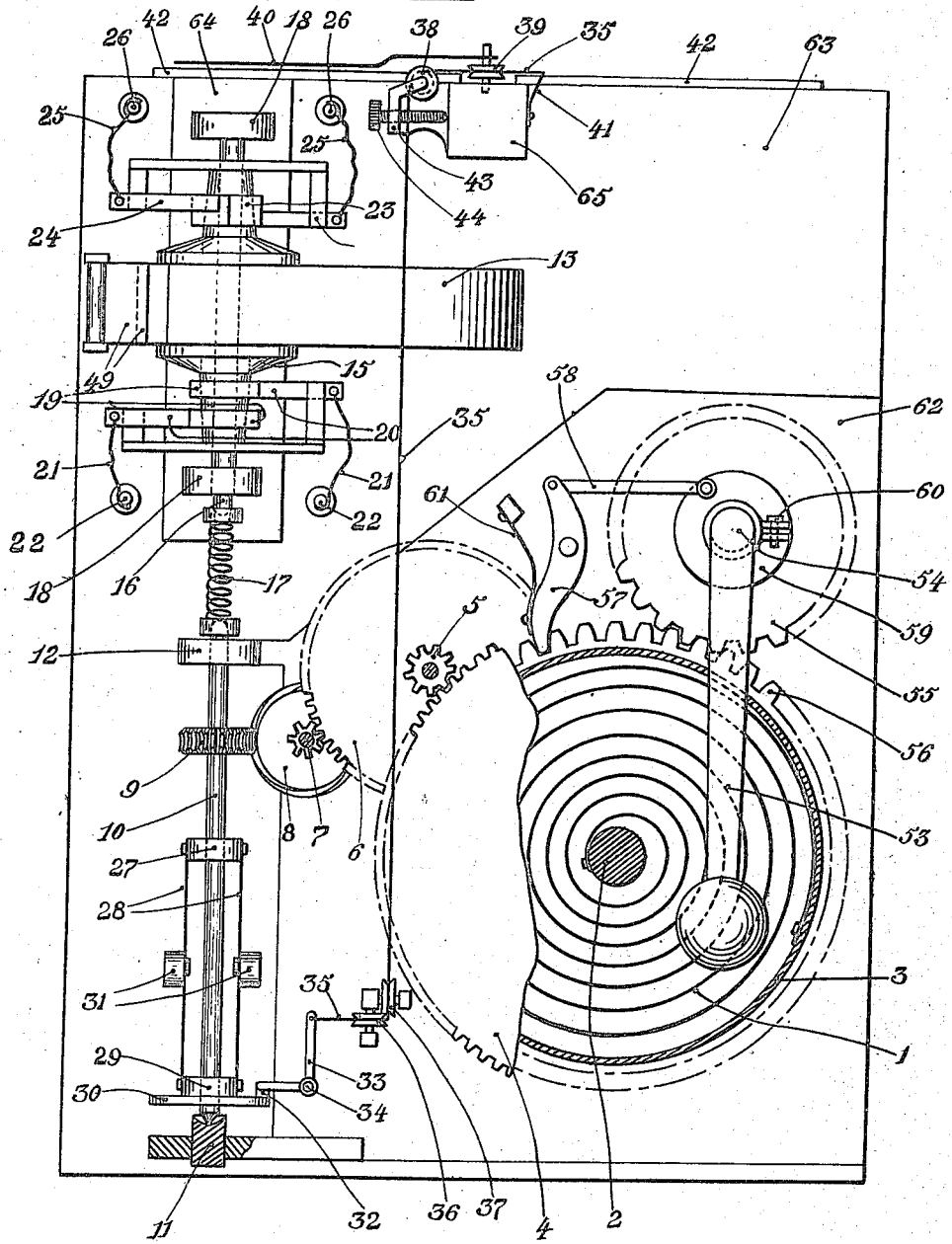

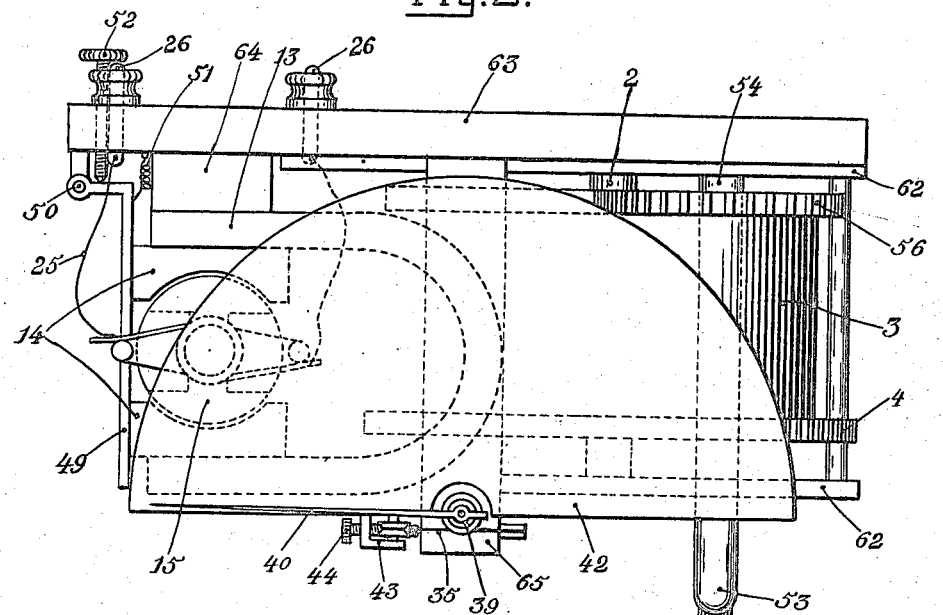
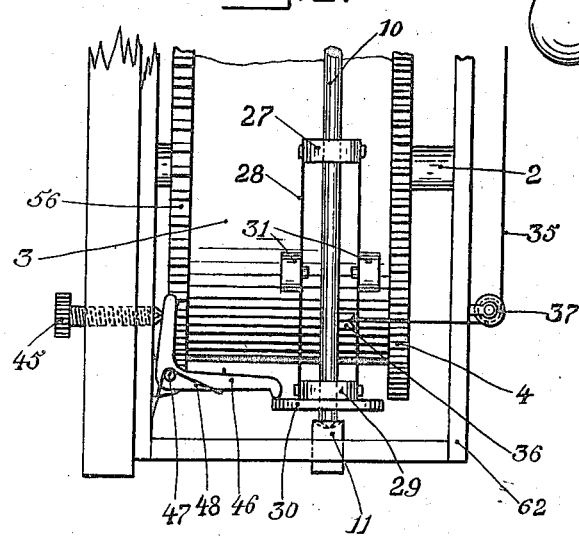

1,457,923

UNITED STATES PATENT OFFICE.

MAURICE COPPÉE, OF MONT-SUR-MARCHIENNE, BELGIUM.

METHOD AND APPARATUS FOR MEASURING ELECTRIC RESISTANCES AND THE LIKE.

Application filed November 12, 1921. Serial No. 514,643.

*To all whom it may concern:*

Be it known that I, MAURICE COPPÉE, subject of the King of the Belgians, residing at Mont-sur-Marchienne, Belgium, have invented certain new and useful Improvements in Methods and Apparatus for Measuring Electric Resistances and the like, of which the following is a specification.

The subject of this invention is a new method and new apparatus for measuring electric resistances and the like, i. e. magnitudes, such as self inductance, capacitance, etc., of which the measurement can be reduced to the measurement of an electric resistance.

Galvanometers and other apparatus of the same nature, commonly used to measure resistances, are delicate to manipulate and are subject to the further objection that they require to be connected with an external source of current and to auxiliary apparatus such as resistance boxes. Operations effected with such apparatus are often lengthy and require profound knowledge of electricity on the part of those who conduct them. The present invention enables such operations to be considerably simplified and the source of current and the indicating apparatus to be grouped together. It also brings the measurement of resistances and of other magnitudes such as temperatures, magnetic fields, coefficients of self-induction, magnetic permeabilities, insulation resistances, earth resistances and capacities, within the capacity of those who are not specialists in the art of electricity.

According to the present invention the element or agent of which the resistance is to be measured is connected with the armature of an electric generator which is subjected to a practically or substantially constant couple or turning effort. The magnitude of the resistance is then determined by measuring the speed of rotation of the armature, which is proportional to the resistance.

If the external circuit is of high resistance the current circulating through the armature will be very weak, the resisting couple will be weak in comparison with the motor or driving couple and the speed of the armature will be only slightly lower than its speed with an open circuit. On the contrary, if the resistance of the external circuit connected with the armature is feeble, the current furnished by the armature, and consequently the resisting couple, will be considerable and the speed of rotation of the armature will be diminished proportionally.

The apparatus according to this invention consists of a motor, actuated for example by a weight or by a spring, capable of developing an effort that is practically constant; dynamo-electric machine or other suitable generator with constant field, such as a magneto-electric machine of which the armature is driven by the motor; and an indicating member for measuring the speed of rotation of the armature. This latter member may be operated by a device constructed on the principle of a centrifugal force governor mounted in connection with the shaft of the motor or electric generator.

The measurement of resistances is thus reduced to a simple measurement of speed of rotation, by means of an apparatus which combines in itself all the features necessary for its working and which can be manipulated in a very simple and easy manner.

In order that the invention may be clearly understood and readily carried into effect or practice an apparatus constructed in accordance therewith is illustrated, by way of example, on the appended drawings, whereon:—

Fig. 1 is a diagrammatic view showing the apparatus in elevation, with a portion of the motor in section, Fig. 2 is a plan and Fig. 3 is a partial elevation in a plane perpendicular to that of Fig. 1.

In the apparatus illustrated by the drawing the motor consists essentially of a spiral spring 1 fixed, at one end, to a spindle 2 and, at the other end, to a box or casing 3 integral with a gear 4. Through multiplying gears 5, 6, 7 and spiral gear wheels 8, 9, the gear 4 actuates a vertical shaft 10 which rests in a socket of foot-step bearing 11 and is guided, at the top, by a bearing 12.

The magneto-electric machine consists of a permanent magnet 13 between the pole pieces, 14, of which the armature 15 rotates. The spindle of the armature 16 is actuated by the shaft 10 to which it is connected by a spring 17 which serves at the same time as an elastic coupling to deaden shocks due to sudden variations of the speed of the armature and as a resilient support for the armature, the weight of which is carried on the socket 11. The shaft 16 turns in bearings 18.

The winding of the armature 15 is connected, on the one hand, to the rings 19 contacting with brushes 20 connected by wires 21 to the terminals 22, at which alternating current can be collected; and, on the other hand, to the collector 23 contacting with brushes 24 connected by wires 25 to the terminals 26 at which continuous current can be collected.

The sound made by the rotation of the armature enables an a priori estimate of the velocity of rotation to be obtained but to obtain exact measurements it is necessary to employ an indicating device.

In the apparatus now under consideration there is secured on the shaft 10 a collar 27 connected by elastic blades 28 to a sliding collar 29 carrying a plate 30. Under the action of centrifugal force weights 31 attached to the blades 28 tend to move away from the shaft 10 and raise the collar 29 with the plate 30 more and more in proportion as the velocity of rotation of the armature increases. On the plate 30 there rests a block 32 carried by one arm of a bell-crank lever 33 which is pivoted at 34. To the other arm of said lever there is attached a silk thread 35 which passes over guide pulleys 36, 37, 38 and makes a turn round the pulley 39 the spindle of which carries a balanced indicating needle or pointer 40, preferably made of aluminium. The end of the thread 35 is attached to a very flexible spring 41 which gives the required tension to the thread.

The pointer 40 moves over the face of a graduated dial 42. To permit of exact regulation of the position of the pointer the position of the pulley 38, which is mounted in an elastic support 43, may be adjusted by means of a screw 44.

The apparatus may be stopped and secured for conveyance, by adjusting a screw 45 (Fig. 3) which presses on one arm of a bell-crank lever 46 pivoted at 47 in such manner as to bring the other arm of the lever into contact with the plate 30. When the screw 45 is turned in the reverse direction a spring 48 moves the lever 46 back out of the way of the plate 30.

It may be desirable to modify the intensity of the magnetic field of the apparatus. To allow of this, in front of the pole pieces 14 of the magnet there is a mild steel plate 49 pivoted at 50 (Fig. 2). The attraction of the magnet and the action of a spring 51 tend to force the plate 49 against the pole pieces, but by turning a screw 52 the position of the plate can be regulated at will by causing it to turn about the pivot 50. The plate 49 serves as a magnetic shunt, the magnetic flux shunted into same being greater the nearer the piece is brought to the magnet. With the aid of this device it is possible to compensate an eventual weakening of the magnet or of the motor couple and to vary the sensitiveness of the apparatus according to requirements.

The motor spring 1 is tensioned by means of a handle 53, the shaft 54 of which carries a pinion 55 engaging a toothed wheel 56 keyed on the shaft 2. The spring 1 is held under tension by a pawl 57 which normally engages the gear 56 and which disengages itself therefrom when the spring is wound up, under the action of a connecting rod 58 articulated to a tightening collar 59 mounted on the shaft 54 of the handle in such manner that it will slide only with considerable friction. It can be adjusted by a screw 60. A spring 61 returns the pawl 57 into engagement with the teeth of the gear 56 on release of the winding handle 53.

The motor mechanism is mounted on a metal frame 62 fixed to a plate or board 63, and the electro-magnetic machine and the pointer member are mounted respectively on blocks 64 and 65, which are also attached to the plate 63 which serves as a support for the whole apparatus. Preferably, the plate 63 is hinged to a box, of which it forms the lid and in which the apparatus is housed.

The apparatus above described is portable and may be made in very small dimensions. As the motor or driving couple, or turning effort, varies with the extent to which the spring is released, the graduation of the dial 42 will be effected by operating with standard resistances, and after the first resistance has been marked care must be taken to verify the motor couple by means of said mark before marking off each of the succeeding resistances.

To make use of the apparatus, it is first started and verified by means of a comparing or standard resistance. After that, all that is required is to connect the circuit containing the resistance to be measured to the terminals 22 or 26, according as it is desired to use alternating or continuous current; the indications of the pointer 40 can then be read directly.

It will be seen that it is easy to measure with this apparatus resistances of the most diverse descriptions, such as those of bobbins, electromagnets, distribution systems, telegraph lines, rail joints on electric railways, etc. By employing the alternating current to do away with the effects of electrolysis the resistance of electrolytes and the internal resistance of batteries and accumulators can also be measured. The apparatus renders it possible also to verify connections of circuits, switchboards, cables, lines, etc. According to the use to which the apparatus is to be put the resistance of the winding of the armature can be varied so that it will be proportionate to the resistance to be measured.

The apparatus can also be used to measure temperatures—for example, by measuring the variations of resistance of a metallic conductor subjected to those temperatures; to measure magnetic fields, for example by measuring the variations of resistance of a spiral of bismuth placed in the field; to measure coefficients of self-induction, for example by connecting the self-induction successively to the continuous current end and to the alternating current end of the apparatus and working on the basis that the resistance of the circuit to alternating current is increased by the self-induction, proportionately to the magnitude of the latter; to measure magnetic permeability, for example by reducing those measurements to the measurement of the self-inductance, for the coefficient of self-induction of the circuit is modified by the permeability of the medium, proportionately to the value of the latter; to measure insulation resistances, for example by connecting to the alternating current end of the apparatus the primary of a transformer of which the high tension secondary is connected to the circuit of which the insulation is to be determined; to measure earth resistances, for example by measuring with this apparatus, connected to a transformer, the resistances, combined two by two, of the earth to be measured and of two auxiliary earths; and to measure capacities, for example by connecting the alternating current end of the apparatus to the primary of a transformer of which the secondary is connected to the capacity to be measured.

This apparatus may also advantageously take the place of batteries and accumulators as a source of continuous current. It is also a very suitable source of alternating current for the methods of measuring that are based on the use of the telephone.

When used as a measurement apparatus the subject of this invention is operated very simply and it offers the great advantage of allowing the operator to have his hands free. Not only does it combine all the elements required for the operations of measuring but it is free from the objectionable features of batteries and accumulators, such as polarization, exhaustion with open circuit and internal short circuits. Its uses are manifold both in industry, in laboratories and as a demonstration apparatus.

It is to be clearly understood that the apparatus described is only one example and that modifications may be made without departing from the scope of the invention.

I claim:

1. The method of measuring electric resistances and the like, consisting in connecting the element to be measured to the armature of an electric generator of constant field, subjecting said armature to a substantially constant couple and measuring the speed of rotation of said armature.

2. Apparatus for measuring electric resistances and the like, comprising a generator of constant field, a motor adapted to rotate said generator, said motor developing a substantially constant couple, and means for indicating the speed of rotation of said generator.

3. Apparatus for measuring electric resistances and the like, comprising a generator of constant field, means for collecting at will direct current or alternating current from said generator, a motor operatively connected with said generator, said motor being adapted to develop a substantially constant couple, and means for indicating the speed of rotation of said generator.

4. Apparatus for measuring electric resistances and the like, comprising a generator having a rotary armature, a winding on said armature, and magnets adapted to develop a substantially constant field, terminals connected to said winding, means developing a substantially constant effort for rotating said armature, and means for indicating the speed of rotation of said armature.

5. Apparatus for measuring electric resistances and the like, comprising a generator having a rotary armature, a winding on said armature, and permanent magnets, a spring motor for driving said armature, and means for indicating the speed of rotation of said armature.

6. Apparatus for measuring electric resistances and the like, comprising a generator having a rotary armature and magnets adapted to develop a substantially constant field, a shaft made of two parts, a spring connecting the two parts of said shaft, said armature being mounted on one part of said shaft, a motor operatively connected with the other part of said shaft, said motor being adapted to develop a substantially constant couple, and means for indicating the speed of rotation of said armature.

7. Apparatus for measuring electric resistances and the like, comprising a support, a vertical shaft carried by said support, said shaft being made of two parts yieldingly connected with one another, magnets carried by said support, an armature mounted on one part of said shaft, a winding on said armature adapted to be connected to an external circuit, a spring motor adapted to drive the other part of said shaft, and means for indicating the speed of rotation of said armature.

8. Apparatus for measuring electric resistances and the like, comprising a magneto-electric machine, means for collecting at will direct current or alternating current from said machine, means for connecting said machine to an external circuit, adjustable means for varying the magnetic field in said machine, a motor developing a substantially uniform couple for driving said machine, and means for indicating the speed of rotation of said machine.

9. Apparatus for measuring electric resistances and the like, comprising a generator having a rotary armature and permanent magnets, an adjustable member forming a magnetic shunt for the flux developed by said magnets, a motor developing a substantially constant couple for driving said armature, and means for indicating the speed of rotation of said machine.

10. Apparatus for measuring electric resistances and the like, comprising a generator having a rotary armature and a constant field, a motor developing a substantially constant couple for driving said armature, a rotary member movable with said armature and displaceable by centrifugal force, an indicating member, and a flexible thread connecting said rotary member with said indicating member.

In testimony whereof I have affixed my signature in presence of two witnesses.

MAURICE COPPÉE.

Witnesses:
HENRY W. PLUCKER,
LEÓN PIÉRARD.